US006135504A

United States Patent [19]

Teng

[11] Patent Number: 6,135,504

[45] Date of Patent: Oct. 24, 2000

[54] BUSINESS FORM FOR DESKTOP PRINTING

[76] Inventor: Eric Teng, 209-4 Selby Ranch Rd., Apt. 4, Sacramento, Calif. 95864

[21] Appl. No.: 09/055,381

[22] Filed: Apr. 6, 1998

[51] Int. Cl.[7] .............................. B32B 3/10; B32B 31/00

[52] U.S. Cl. ........................... 283/67; 283/101; 283/105; 283/902; 462/6; 462/27; 462/66; 462/81; 462/78

[58] Field of Search ................................... 462/6, 27, 66, 462/78, 81; 283/101, 105, 902

[56] References Cited

U.S. PATENT DOCUMENTS

| | | | |
|---|---|---|---|
| 5,389,414 | 2/1995 | Popat | 283/105 |
| 5,702,789 | 12/1997 | Fernandez-Kirchberger et al. | 283/81 |

*Primary Examiner*—Andrea L. Pitts
*Assistant Examiner*—Mark T. Henderson
*Attorney, Agent, or Firm*—Mark C. Jacobs, Esq.

[57] ABSTRACT

A business form having a faceplate, a retainer frame, and at least one lift-off panel formed from at least one cutout in the faceplate with retaining members of a releasable adhesive backer being disposed on the reverse side of the faceplate with the adhesive facing the at least one cutout opening. Precut lift-off panels of the same material remain disposed at least one per cutout and adhered to the backer member primarily for printing in a laser or inkjet printer to produce at least one and preferably multiple lift-off panels each of which constitutes one card. Indicia or images can be printed onto the business form and individual printed cards can be obtained by lifting off the printed individual lift-off panels on an as-needed basis. Two-sided printing is optional.

16 Claims, 5 Drawing Sheets

BUSINESS FORM FOR DESKTOP PRINTING

FIELD OF THE INVENTION

This invention relates to business forms used in the desktop printing of indicia or images onto full-size sheets of card stock which full-size sheets contain individual cards of a size smaller than the full-size sheet, which cards are releasable from the full-size sheet upon completion of the printing procedure.

BACKGROUND OF THE INVENTION

In recent years, many people have elected to do their own desktop printing of their business cards, postal cards and the like using a personal computer and an ink jet or laser printer. This is due to the convenience and relatively lower cost than having the task done by commercial printers. Thus, companies such as Avery produce business forms which consumers can use to design and print their own business cards. Usually these forms are produced on 8½×11 inch sheets with a total of 10 business cards of size 3½×2 inch each laid out in two (2) columns by five (5) rows format. After printing of the cards, each individual card can be separated for use. However, business forms intended for this and other similar purposes are invariably produced with "micro-perforation" on the sheets in a manner similar to postage stamps to enable the separation of the individual cards after printing. These business forms are deemed to be less than professional because they suffer from certain inherent disadvantages. Thus it has been found that it takes considerable effort and care to separate the cards to ensure that each card remains intact. The corners of the cards are especially prone to unintentional tear during the separation procedure. Due to the micro perforations, each separated card has a jagged look on the edges, which is highly undesirable for professional use. Another detrimental factor is the fact that the quality of the card stock that can be employed in these prior art techniques is restricted to card stocks that are easy to be torn apart at the perforation. Therefore only relatively thin stock is available in the pre-micro perforated format. Because of the above shortcomings, the desktop printing of business cards has only a limited market appeal despite the flexibility and convenience and other advantages such a procedure enjoys over commercial printing.

In the area of the desktop printing of digital photos, complete uncut sheets of photo quality paper (e.g. HP Photo Paper for Inkjet Printing) are used. After the images are printed, consumers have to use special cutters to cut the photo sheets into individual photos since no means of releasing each individual photo is provided. This too requires special effort on the part of the operator.

In reviewing the prior art, applicant came upon the U.S. patent of Greig, assigned to Moore Business Forms, Inc. namely U.S. Pat. No. 5,403,236 issued Apr. 4, 1995. The invention herein represents a significant improvement over the invention of that patent.

Therefore it is a first object of this invention to provide a business form with card stock which would allow the printing of individual cards with clean cut edges without a jagged look.

It is a second object to provide a business form, which employs a card stock, which would permit easy and complete separation of the individual cards upon completion of printing from the business form.

It is another object to provide a business form which is able to employ the production of business cards and other cards from card stock of any desirable quality, including thicker card stocks, card stocks that cannot be torn apart, plastic card stocks or photo quality card stocks.

It is yet another object to provide a business form for which no special cutter is required for the separation of individual cards therefrom.

It is still another object to provide a business form for the improvised desktop printing of other cards such as but not limited to digitized photos, ID cards, name tags, greeting cards, sports cards, ROLODEX® cards of all sizes, and novelty cards among others.

Other objects of the invention will in part be obvious and will in part appear hereinafter.

The invention accordingly comprises the device possessing the features, properties, and the relation of components which are exemplified in the following detailed disclosure and the scope of the application of which will be indicated in the appended claims.

For a fuller understanding of the nature and objects of the invention reference should be made to the following detailed description, taken in conjunction with the accompanying drawings.

SUMMARY OF THE INVENTION

A business form which comprises a faceplate with at least one precut lift-off panel therefrom, removably disposed within a substantially similarly sized retainer frame; the retainer frame being a cutout within the faceplate; and removable adhesive backer member applied onto the back of the faceplate and overlaying the at least one previously precut lift-off panel preventing such from dislodging during a printing cycle, until manual lift-off is carried out. The backer member can be a series of adhesive backing strips or a backing frame. Printing can take place on both the obverse and reverse surfaces of each panel.

DESCRIPTION OF THE PREFERRED EMBODIMENT

Figure 1:
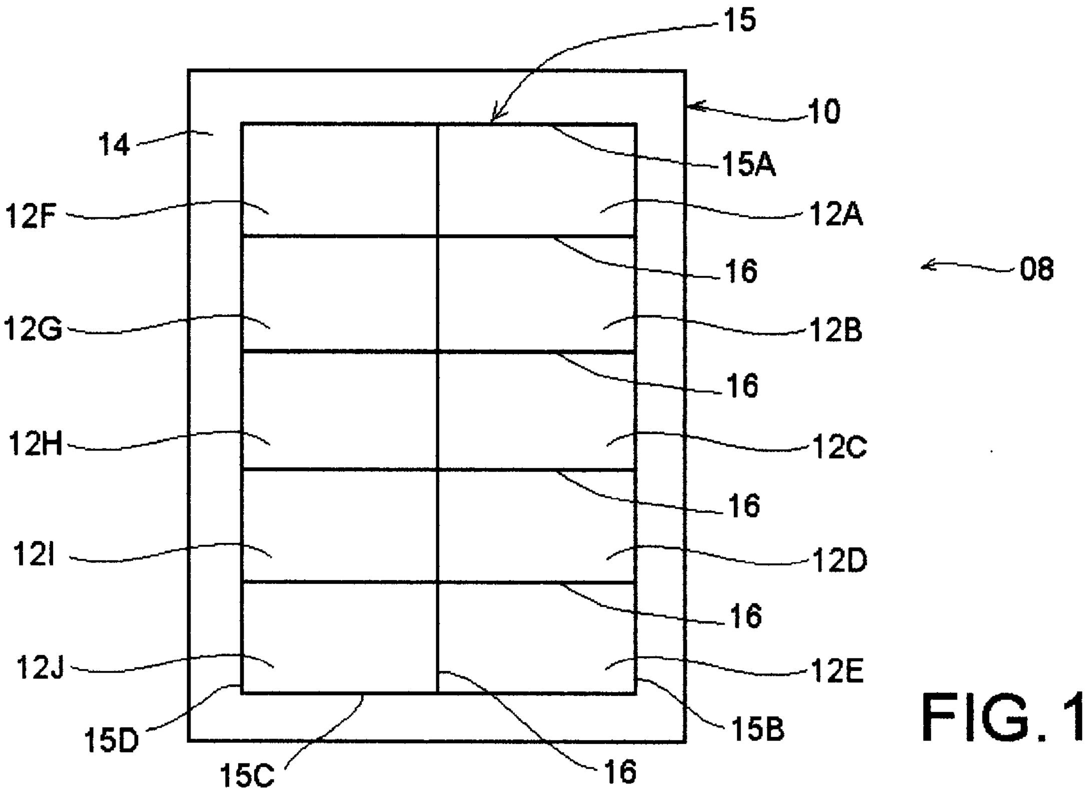
FIG. 1 is a top plan view of the obverse side of a first embodiment of a business form with die-cut lift-off panels laid out in 2 columns by 5 rows format according to this invention.
Figure 2:
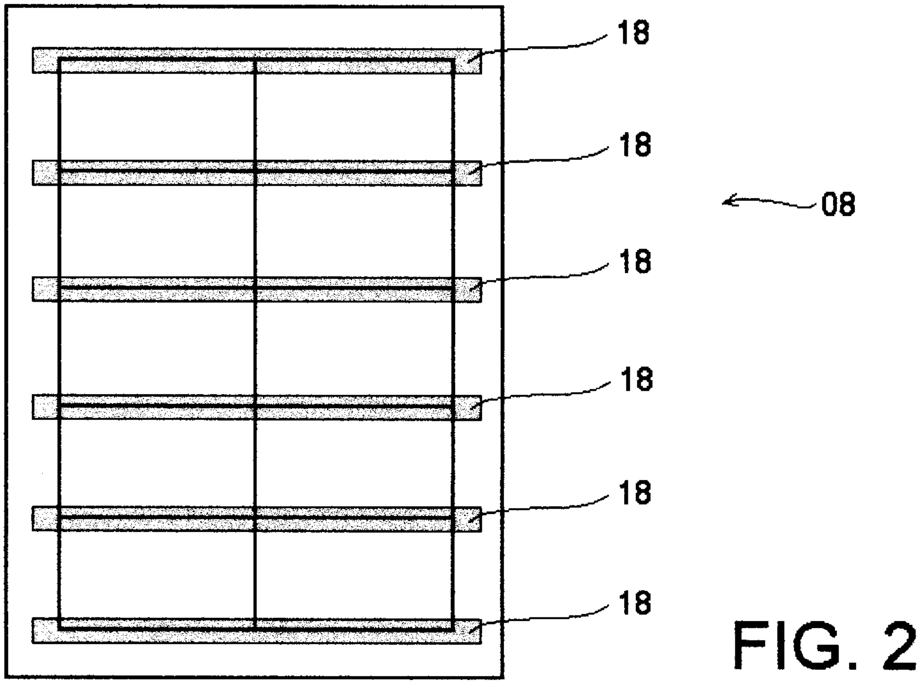
FIG. 2 is a top plan view of the reverse side of the same business form wherein the lift-off panels are secured within the retainer frame by a plurality of removable adhesive backing strips.

A typical embodiment of the business form of this invention is illustrated in FIG. 1 (top plan view) and FIG. 2

(bottom plan view). While the invention can employ any number of precut lift-off panels 12(A–J), disposed within the confines of the faceplate 10, a configuration having 10 such lift-off panels is depicted in the first embodiment shown here.

The business form 08, has a faceplate 10 of a predetermined thickness of a material such as card stock or plastic or coated paper, of a size suitable for flow through an inkjet or laser printer.

The faceplate 10 is seen in this first embodiment to be precut into 2 columns by 5 rows of rectangularly configured lift-off panels each designated separately within the series 12A–12J. All ten of the precut lift-off panels 12A–12J are disposed abutting one another within the confines of a retainer frame 14. Retainer frame 14 is formed from a rectangular cutout 15 along four edges 15A–15D within the faceplate, and the adhesive members to be discussed supra, which serve to retain the series of lift-off panels within cutout 15. The lift-off panels are held in position within the retainer frame by the application of a series of spaced adhesive backing strips 18 which are disposed on the reverse side of the faceplate 10 at suitable locations to overlay two parallel edges of each of the ten members of the series of lift-off panels, 12A–12J. These locations are specifically chosen to coincide with appropriate sections of the severance lines 16, 15A and 15C which represent the horizontal borders of each of the individual members of the lift-off panel series. The lengths of the individual strips 18 are chosen to extend beyond the border of the cutout 15 as is seen in FIG. 2 to retain all of the members of the series of individual members within the cutout 15.

The individual strips 18 may be formed from cut lengths of readily releasable adhesive tape such as that sold under the brand name MAGIC® tape by 3M Company, or equal. The MAGIC® tape forms a weak bond with the substrates attached thereto such that the substrate, here panel members, can be readily removed from the tape and vice versa.

Figure 3:
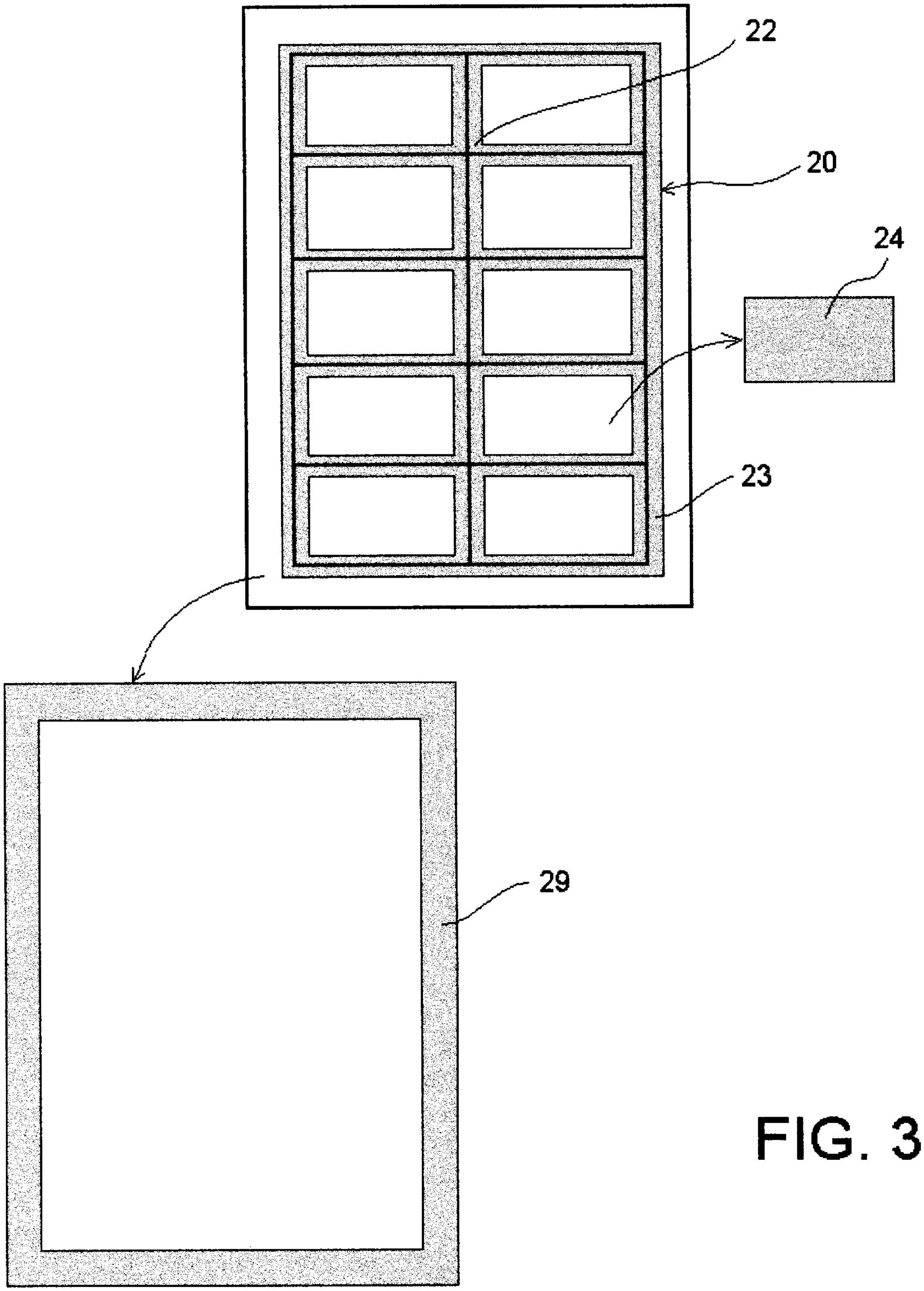
FIG. 3 is a top plan view of the reverse side of the first embodiment of this invention wherein lift-off panels are secured within the retainer frame by a removable adhesive backing frame.
Figure 7:
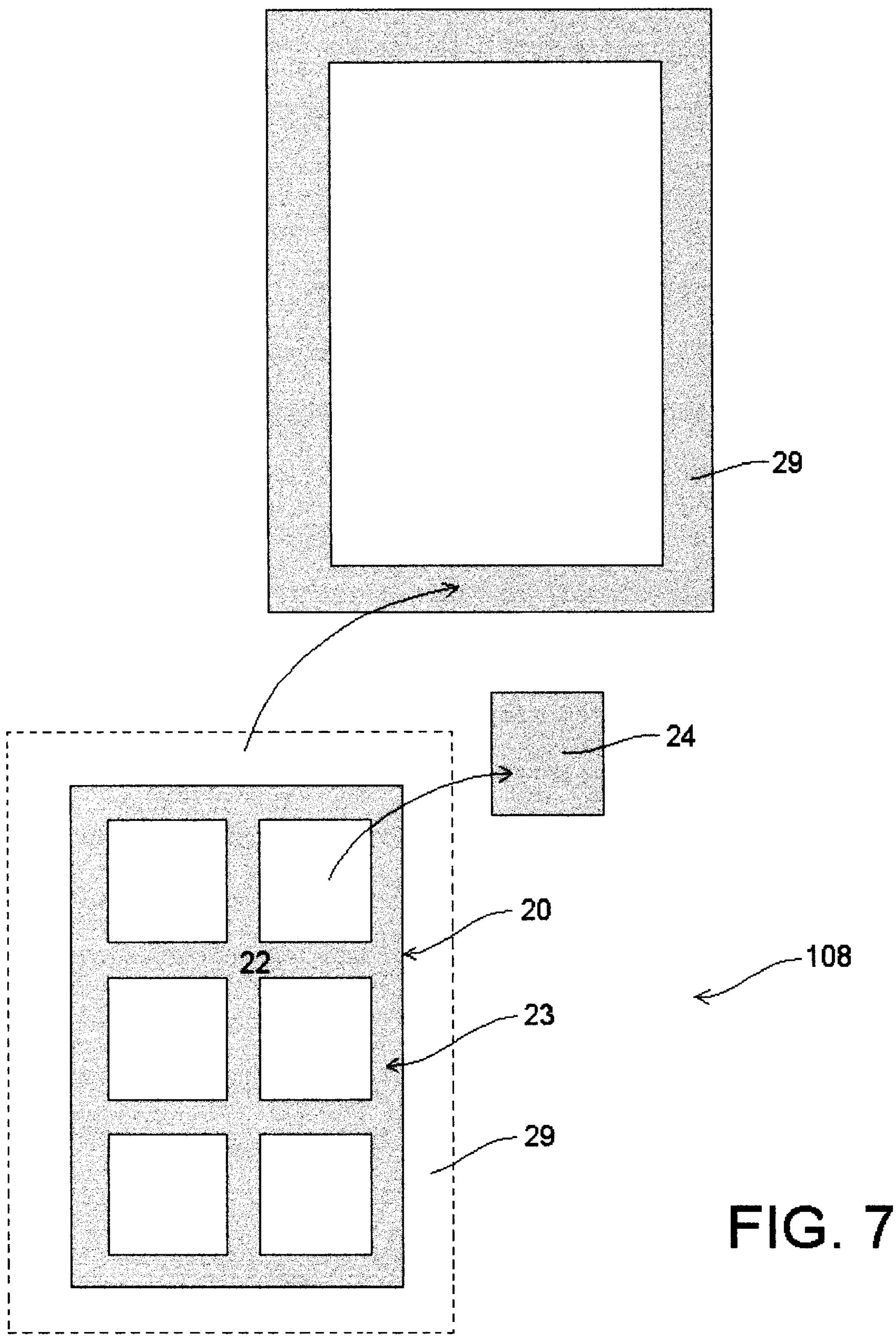
FIG. 7 is a top plan view of a retainer frame as employed in this invention and it also shows the material removed to create the retainer frame.

An alternative form or variant of the backing member is shown in FIG. 3. A backing frame 20 is preferably formed by die-cutting ten windows into a full-sized sheet of adhesive coated self-supporting film such as a Mylar®, 23. Each removed window 24 is then discarded. An appropriate width of the edge, or margin 29, is also trimmed leaving the backing frame 20. Reference is also made to FIG. 7.

In addition, though much more labor intensive, is to form a frame by adhering a plurality of individual strips in spaced vertical and horizontal dispositions. Such a strip would be designated 22 and can be seen in FIGS. 3 and 7.

If the cutout is of a different configuration than rectangular, and the panels are disposed either in an abutting relationship as in FIG. 1, or other than in an abutting relationship, those skilled in the art can select the shape of the backing frame to be made in a suitable other shape or arrange the backing strips appropriately so as to sufficiently cover the severance lines to secure the particular series of lift-off panels within the retainer frame's cutout.

Figure 4:
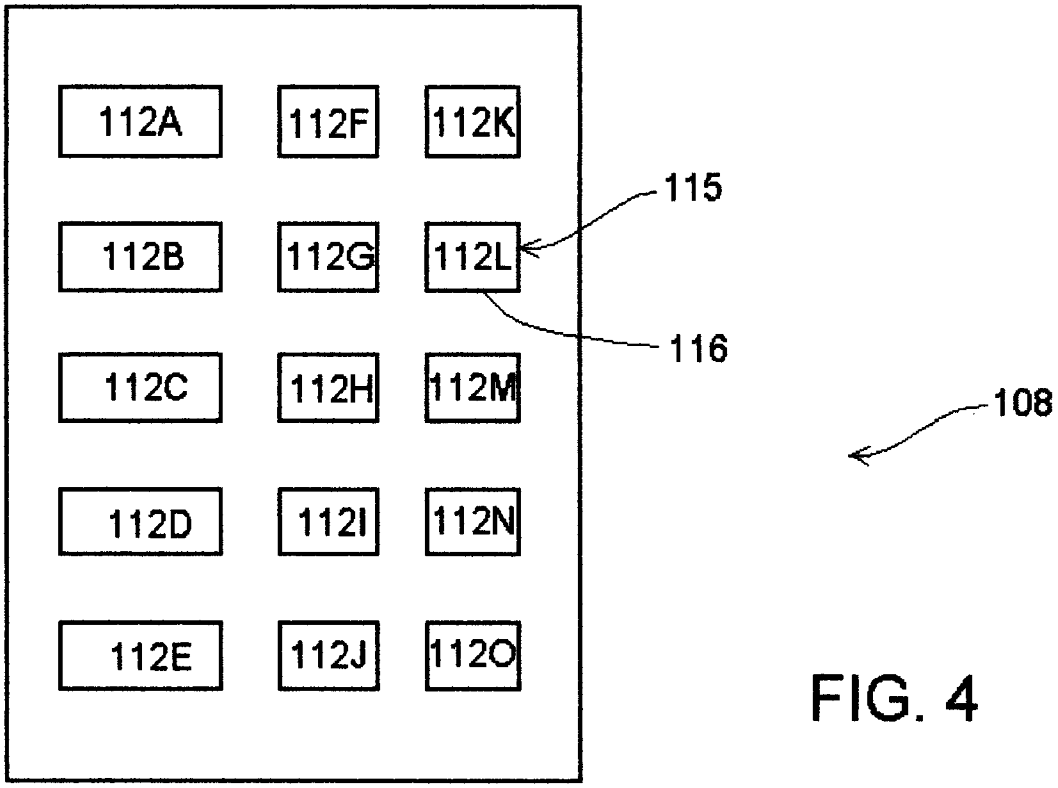
FIG. 4 is a top plan view of the obverse side of a second embodiment of a business form with die-cut lift-off panels laid out in a 3 column by 5 rows format according to this invention.
Figure 5:
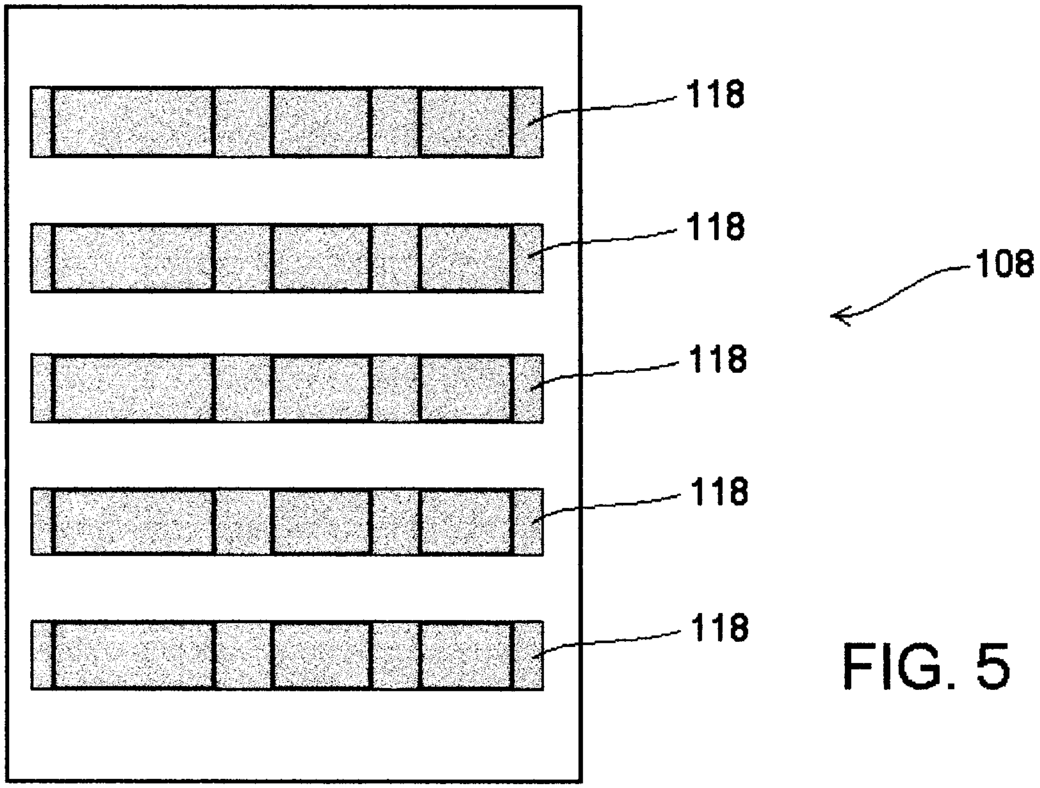
FIG. 5 is a top plane view of the reverse side of the business form of FIG. 4.

In FIGS. 4 and 5, wherein related numbers refer to like parts, a second embodiment 108, is seen but wherein like parts are numbered within the 100 series. Thus faceplate 110 may be of the same or different stock as faceplate 10. But as in the previous embodiment the panels are all cut from the stock of the faceplate 110. Cutout 115 is seen to have disposed therein a series of panels 112, the individual 15 members being designated 112A–112O. The severance lines 116 define the discrete borders of each individual lift-off panel. Here two distinct sizes of panels are included within the series. Such a series of panels 112 can be utilized for an admission ticket to an event, —the larger size 112A–112E, with the small ones 112F to 112O be used to procure a hot dog and perhaps a cold drink. This is a use in contrast to the first series 12, which has been suggested as being suitable for business cards. The individual lift-off panels, each one of which equals one card or chit in this second embodiment, are seen to be retained in place by backing strips 118 which are of a similar structure to strips 18. No further discussion of the second embodiment is deemed necessary in view of the similarity of elements. In FIG. 5, the reverse side of the panels is seen held by a backer member comprising a series of adhesive strips.

Figure 6:
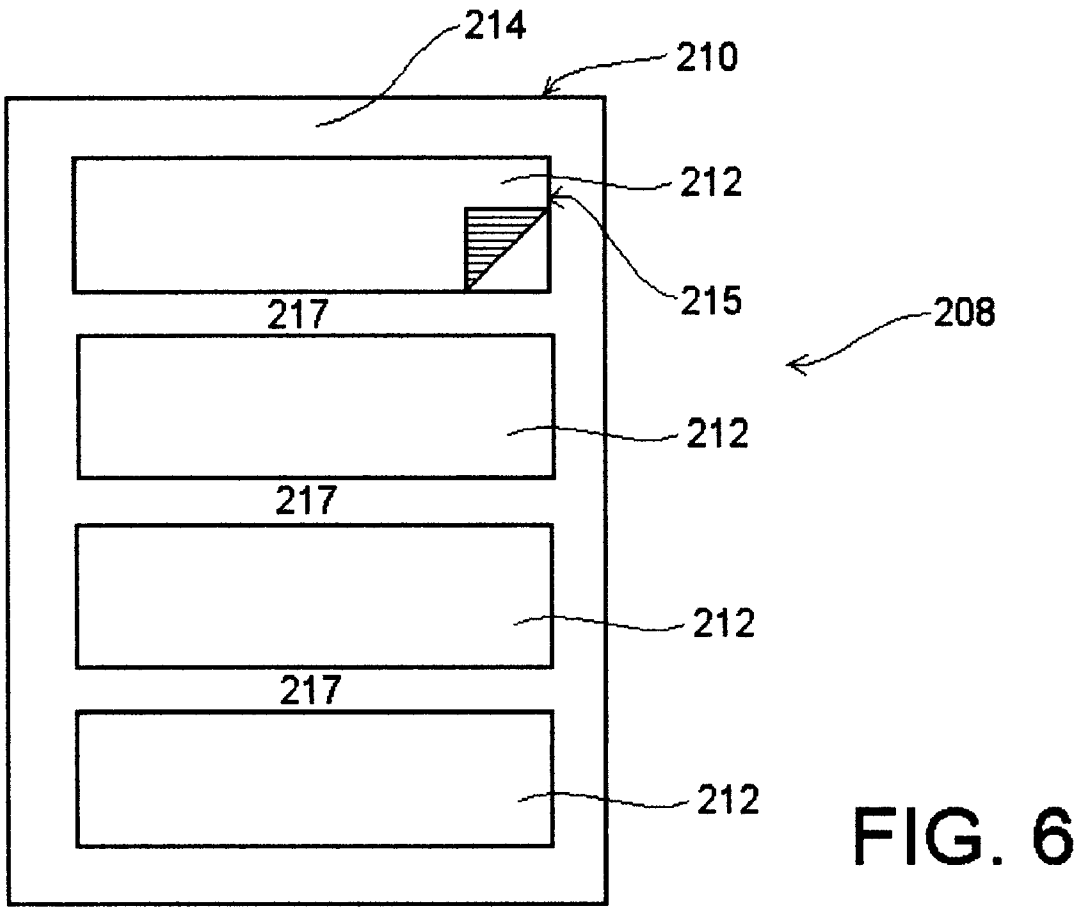
FIG. 6 is a top plan view of the obverse side of a third embodiment of this invention, wherein the individual panels are not in an abutting relationship, and one such panel is shown in the process of being removed.

In FIG. 6, again related numbers refer to similar parts. Here a third embodiment 208 of the business form is seen. This embodiment 208 employs a faceplate 210 having a frame 214 formed of a plurality of four individual cutouts 215. A series of selvage strips 217 are seen. One selvage strip 217 separates each cutout 215 and its panel 212 disposed in the respective cutout from the next such cutout and panel combination. Each of these panels has been previously die-cut from this faceplate and then retained in a cutout for use. The use of selvage strips 217 permits standard size stock such as A4 or Letter (8.5×11") to be employed in the paper carrying carriages of the various printers for which these products are intended, yet permit odd sized lift-off panels to be utilized. Thus the panels 212 are seen to be in a non-abutting relationship within the frame 215.

Backing strips 18 or a suitable backing frame 20 configured to the frame 214 and the plurality of cutouts 215 can be easily devised by one of ordinary skill and need not be illustrated. In like fashion a backing frame can be readily configured to match the frame and cutouts as preselected.

The faceplate is typically of predetermined thickness and quality appropriate for its intended application and of suitable size. While most printers are limited to A4 and Letter size, some printers are currently available to print on paper that is Tabloid, i.e., 11"×17":, and so faceplate stock of this size as well as other so-called standard size falls within the scope of this invention. In addition to card stock the faceplate can be made of a self-supporting flexible plastic film such as of polyethylene terephthalate and coated paper among others, just so long as the substrate will accept and hold printed information thereupon.

While the most logical combination both for manufacturing and packaging reasons, is to have the lift-off panels cut from the actual stock used for the faceplate, by having such a requirement, every panel is guaranteed to fit within its respective cutout. Selvage which represents unremoved portions of the faceplate would be of the same material by necessity.

The adhesive backing strips are of the removable type and typically ranges between 0.5 inches and 1 inch wide. Good results have been obtained with Scotch Removable Magic Tape #811 produced by the 3M Company. Other releasable adhesive tape may also be used.

Depending on the intended application of the business form and design preference, there are various possibilities of the material of construction and dimension on the faceplate; the positioning, the quantity, the shape, and dimensions of the lift-off panels; and the shape, dimensions, quality and positioning of the backing strip or backing frame which serve as the backer member.

Operation and Utilization

The use of the business forms of this invention for the desktop printing of business cards and other information cards, digital photos and the like requires the use of a printing software. One such commonly available business card printing software package is My Business Cards produced by MySoftware Company. Other business card printing programs are also available in the marketplace for both "Mac" and PC computers. Word processing software can also be employed to create cards from the business form product of this invention. PRINT SHOP ENSEMBLE by Broderbund Software is believed suitable for printing graphics based cards.

While the following discussion pertains specifically to business card printing, the printing of other types of cards on the business form of this invention is readily understandable. Thus, in accordance with the respective program's instructions, one first inputs information such as name, title, address or location, etcetera into the computer. Then the faceplate, carrying the one or more lift-off panels which has already been placed into the paper carriage of the printer, awaits the cue to signal the computer printer for printing. The input information is then printed onto the faceplate's individual panel's obverse side and restricted generally to within each lift-off panel's confines as may have been pre-determined.

If indicia are required to be printed on the reverse side of the one or more lift-off panels, printing on the reverse side of the previously affixed panels can take place, but limited to the space not covered by the backing strips or frame, whichever of these is used, by merely turning over the faceplate with the precut lift-off panels intact for the second printing session.

After printing either once or twice, the lift-off panel can be be peeled off from the backing frame or backing strips, as the case may be, one or more at a time for use as individual business or other cards. Alternatively, the faceplate with the lift-off panels intact can be filed in a 3-ring binder for convenient on-the-road use with removal of each lift-off panel being on a when-needed as-needed basis.

The use of the business form of this invention for other applications such as desktop printing of digital photos is similar to that described above. And requires no further elaboration, just a specific photo printing program.

Conclusion, Ramifications and Scope

Accordingly, the reader will see that the business form of this invention can be used for desktop printing of indicia and/or images. The individual cards with such indicia and/or images printed can be easily made available by peeling off the lift-off panels on an as-needed basis. Furthermore, the individual cards thus created will have the additional advantages in that being diecut, they will lack the jagged edges and look of microperforated cards currently available. Since the cards are available on an on-demand basis, the stock of the faceplate can be either pre or subsequently punched for storage in a 3-ring binder.

While the discussion has related to the use of the products of this invention for both inkjet and laser printers, it is also to be seen that these products will operate in die sublimation color printers and with other new printer technologies. In addition, printing can transpire in dot matrix and daisy wheel printers if the faceplate is used in a cut-sheet feeder.

As utilized in this application and claims, the term indicia is intended to encompass text, graphics and photos.

Although the description above contains many specificities and pertains to the desktop printing of business cards and digital photos only, it should not be construed as limiting the scope of the invention but as merely providing illustrations of some of the typical embodiments of this invention.

I claim:

1. A business form for the desktop printing of indicia, comprising:

a faceplate having an obverse and a reverse side and sized for printing in a conventional computer printer, said faceplate comprising a retainer frame with at least one first cutout therein, said faceplate having a backer member comprising at least one releasable adhesive retaining member having at least one second cutout therein sized smaller than said at least one first cutout, which backer member overlies said retainer frame on the reverse side of said faceplate, and extending slightly interiorly beyond the confines of said at least one first cutout, and wherein the adhesive is disposed around each at least one second cutout, at least one precut lift-off panel from said faceplate, adapted to carry printed indicia thereon, and being releasably adhered to said at least one adhesive retaining member's adhesive.

2. The product of claim 1 wherein the precut lift-off panels are precut from inkjet printer photo quality paper.

3. The product of claim 1 wherein the at least one panel is a finite number of precut panels which number corresponds to the at least one finite number of cutouts in the faceplate.

4. The business form of claim 1 wherein said lift-off panels are laid out and retained in a series of rows and columns within a single cutout.

5. The business form of claim 1 wherein said lift-off panels are laid out and retained in a series of rows and columns within a plurality of cutouts.

6. The business form of claim 1 wherein the lift-off panels are printed on at least the obverse side thereof.

7. The business form of claim 1 wherein the lift-off panels are printed on both the obverse and reverse sides thereof.

8. The product of claim 1 wherein the precut lift-off panel are precut from printer photo quality paper.

9. The product of claim 1 wherein the at least one panel is a finite number of precut panels which number corresponds to the at least one finite number of cutouts in the faceplate.

10. The business form of claim 1 wherein there are a plurality of cutouts in the retainer frame.

11. The business form of claim 10 wherein the member for retaining the lift-off panels is a single adhesive retaining frame and the adhesive is disposed continuously around the single retaining frame.

12. The business form of claim 1 wherein the retainer frame has only one cutout.

13. The business form of claim 10 wherein the first and second cutouts are rectangular.

14. A method of producing a business form from a faceplate sheet having an obverse and a reverse side and an adhesive backer comprising an adhesive backing sheet, comprising the steps of:

(a) forming at least one first cutout with edges by die-cutting a faceplate sheet to produce at least one lift-off panel with edges within a retainer frame, and (b) die cutting at least one releasable adhesive backing frame for said faceplate from an adhesive backing sheet, to form a second cutout slightly smaller in dimension than said at least one first cutout, said at least one backing frame having adhesive around all the sides thereof, and (c) applying said at least one backing frame onto the reverse side of said faceplate sheet and overlapping the edges of said lift-off panels and the edges of said at least one second cutout with said backing frame so as to adhere said at least one lift-off panel within said retainer frame for desktop printing.

15. The method of claim 14 further including the steps of (e) changing the indicia to be printed on the panels, and (f) reversing the panels such that the backer member is face up, and (g) printing the indicia on the panels reverse side.

16. The method of claim 1 wherein the forming step comprises forming multiple lift-off panels.

* * * * *